(12) United States Patent
Lundholm et al.

(10) Patent No.: US 6,782,208 B1
(45) Date of Patent: Aug. 24, 2004

(54) WIRELESS COMMUNICATION DEVICE AND METHOD HAVING COORDINATED PRIMARY AND SECONDARY TRANSMITTERS

(75) Inventors: Andrew S. Lundholm, Hoffman Estates, IL (US); Chris Grivas, Crystal Lake, IL (US); Jeffrey T. Curtis, Lake Villa, IL (US); Julius S. Gyorfi, Lake Bluff, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/440,882

(22) Filed: Nov. 16, 1999

(51) Int. Cl.[7] .............................................. H04B 10/00
(52) U.S. Cl. ..................... 398/135; 398/106; 398/107
(58) Field of Search ............................... 359/135, 142, 359/143, 145, 152, 154; 398/92, 106, 107, 135, 140

(56) References Cited

U.S. PATENT DOCUMENTS

| | | | |
|---|---|---|---|
| 4,904,993 A | | 2/1990 | Sato |
| 4,972,455 A | | 11/1990 | Phillips et al. |
| 5,034,997 A | | 7/1991 | Iwasaki |
| 5,138,649 A | * | 8/1992 | Krisbergh et al. .......... 348/734 |
| 5,309,502 A | | 5/1994 | Hirai |
| 5,343,319 A | * | 8/1994 | Moore ........................ 398/115 |
| 5,500,691 A | | 3/1996 | Martin et al. |
| 5,585,953 A | * | 12/1996 | Zavrel ................... 340/825.72 |
| 5,659,883 A | | 8/1997 | Walker et al. |
| 5,675,395 A | | 10/1997 | Martin et al. |
| 5,907,418 A | * | 5/1999 | Walczak et al. ............ 398/106 |
| 5,929,770 A | * | 7/1999 | Faita ........................ 177/25.15 |
| 5,930,706 A | * | 7/1999 | Raith ....................... 455/422.1 |
| 5,999,294 A | * | 12/1999 | Petsko ........................ 398/115 |
| 6,081,356 A | * | 6/2000 | Branc et al. ................ 398/129 |
| 6,093,146 A | * | 7/2000 | Filangeri .................... 600/300 |
| 6,104,512 A | * | 8/2000 | Batey et al. ............... 340/7.54 |
| 6,396,612 B1 | * | 5/2002 | Bjorndahl .............. 340/825.69 |

FOREIGN PATENT DOCUMENTS

| | | | |
|---|---|---|---|
| DE | 4433896 | * | 9/1995 |
| WO | WO 95/05709 | | 2/1995 |

* cited by examiner

Primary Examiner—Leslie Pascal
Assistant Examiner—Dzung Tran
(74) Attorney, Agent, or Firm—Sylvia V. Chen; Roland K. Bowler, II

(57) ABSTRACT

A wireless communication device (10) includes a radio frequency transceiver (22) adapted for burst transmission responsive to a control signal in accordance with at least one communication protocol and an infrared transceiver (24) adapted for asynchronous data communication in coordination. The infrared transceiver (24) is responsive to the control signal to suspend an ongoing data communication for the duration of the burst transmission and to resume the data communication following the burst transmission. A controller (20) is coupled to each of the radio frequency communication module (22) and the infrared communication module (24), and the controller (20) is operable to generate the control signal in accordance with the at least one communication protocol.

21 Claims, 2 Drawing Sheets

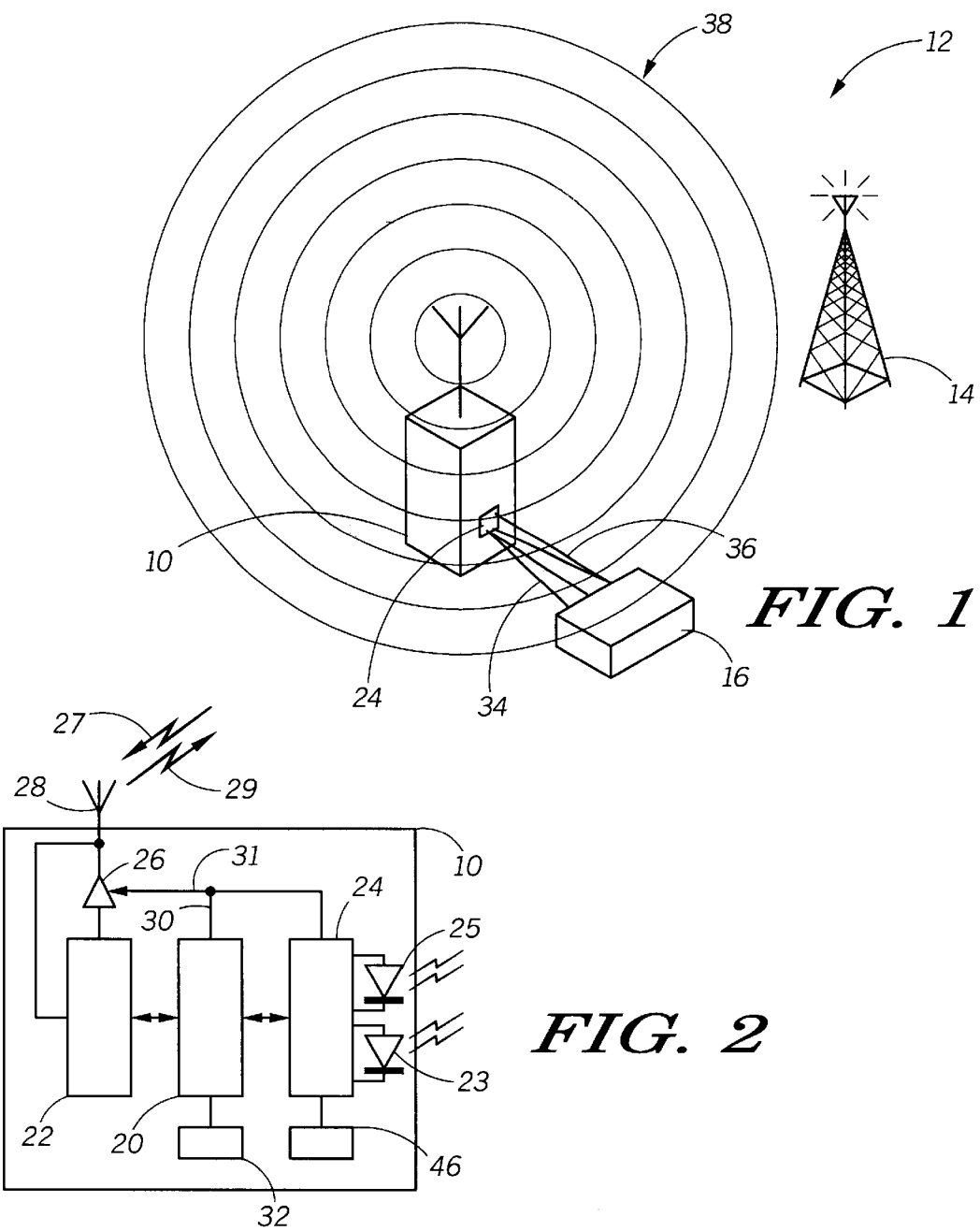
FIG. 1
FIG. 2
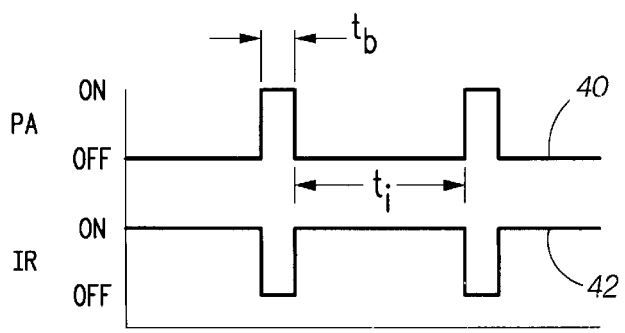
FIG. 3

WIRELESS COMMUNICATION DEVICE AND METHOD HAVING COORDINATED PRIMARY AND SECONDARY TRANSMITTERS

FIELD OF THE INVENTION

The present invention relates generally to communication systems and, more particularly, relates to a communication device having coordinated primary and secondary transmitters and a method for operating such a communication device.

BACKGROUND OF THE INVENTION

The capabilities, features and functions of wireless communication devices, such as cellular radiotelephones, pagers and the like, have expanded tremendously and continue to grow. The wireless communication device is typically designed to utilize one or more wireless communication standards for providing primary two-way voice and data communications via a communication network. Additionally, within the devices themselves, it is now possible to store and retain (for example) numerous names with associated phone numbers and addresses. It is also possible to keep an appointment calendar, task list and other personal organizer information within the memory of the wireless communication device. To facilitate the exchange of such data between devices, e.g., between other wireless communication devices, personal computers (PCs), personal digital assistants (PDAs), and the like, a secondary, low-power data transmitter and receiver may be provided.

Infrared (IR) communication technology provides a convenient form of low-power, limited range, wireless data transmission. Hence, it is not surprising that this technology has been adapted to wireless communication devices to allow these devices to communicate with other such devices and with IR capable PCs, PDAs and the like. For example, low cost, compact modules, such as the HSDL-3201 IrDA data transceiver available from Hewlett-Packard, are designed for adaptation to wireless communication devices and provide relatively fast data transfer using IR transmission and reception. These devices may provide a communication link from between 20–100 centimeters (cm), and data transmission rates up to 115.2 kilobits/ second (kb/s).

A complication that arises from the inclusion of IR transceivers in radio frequency (RF) wireless communication devices relates to the electro-magnetic fields produced by the wireless communication device. For example, a cellular radiotelephone may produce an electromagnetic field in close proximity to the antenna as high as 1 volt/meter. This field strength can effect electronic devices within a range of up to a meter. As noted, commercially available IR transceivers are typically designed to operate within about 20–30 cm, which is well within the relatively strong RF field created by the wireless communication device.

A problem arises if the electronic devices do not operate correctly in the presence of large RF fields, such as the locally large RF field generated by the transmitter of the proximally located wireless communication device. While the wireless communication device is designed to operate within these fields, and therefore, is unlikely to have its operation effected by them, many peripheral devices may not be so tolerant. And, even where a device is designed with appropriate shielding and filtering to guard against anomalous circuit operation and to reject noise generated as a result of the field, if the field is strong enough, operation of the device may still be adversely effected. The end result is an end user that is dissatisfied with the performance of the wireless communication device and/or the peripheral device for exchanging data.

One reason why the RF field may affect these devices is found in the design of the peripheral device. For example, the conductive traces and wiring leads within the peripheral device act like antennas to the RF field thereby coupling the RF energy from the field into the transceiver circuit. Also, the IR communication module includes a receiver, and the receiver will necessarily include amplifiers and other non-linear devices. It is possible, in the presence of a strong enough RF field, that these devices will actually rectify the RF energy within the field thus generating a current wave. This current wave can easily overload the following circuit elements. Furthermore, the transimpedance amplifier typically found in IR receivers can convert the current wave to a noise voltage thereby reducing the signal-to-noise ratio significantly.

Thus, there is a need for a communication device that includes a primary communication system and a secondary communication system and a method of controlling such a communication device so that as to ensure reception at a peripheral device of transmissions by the secondary communication system.

BRIEF DESCRIPTION OF THE DRAWINGS

FIG. 1 is a schematic illustration of a wireless communication device in communication with a peripheral device.

FIG. 2 is a block diagram illustration of a wireless communication device in accordance with a preferred embodiment.

FIG. 3 is a timing diagram illustrating operation of the wireless communication device shown in FIG. 2.

DETAILED DESCRIPTION OF THE PREFERRED EMBODIMENTS

Figure 4:
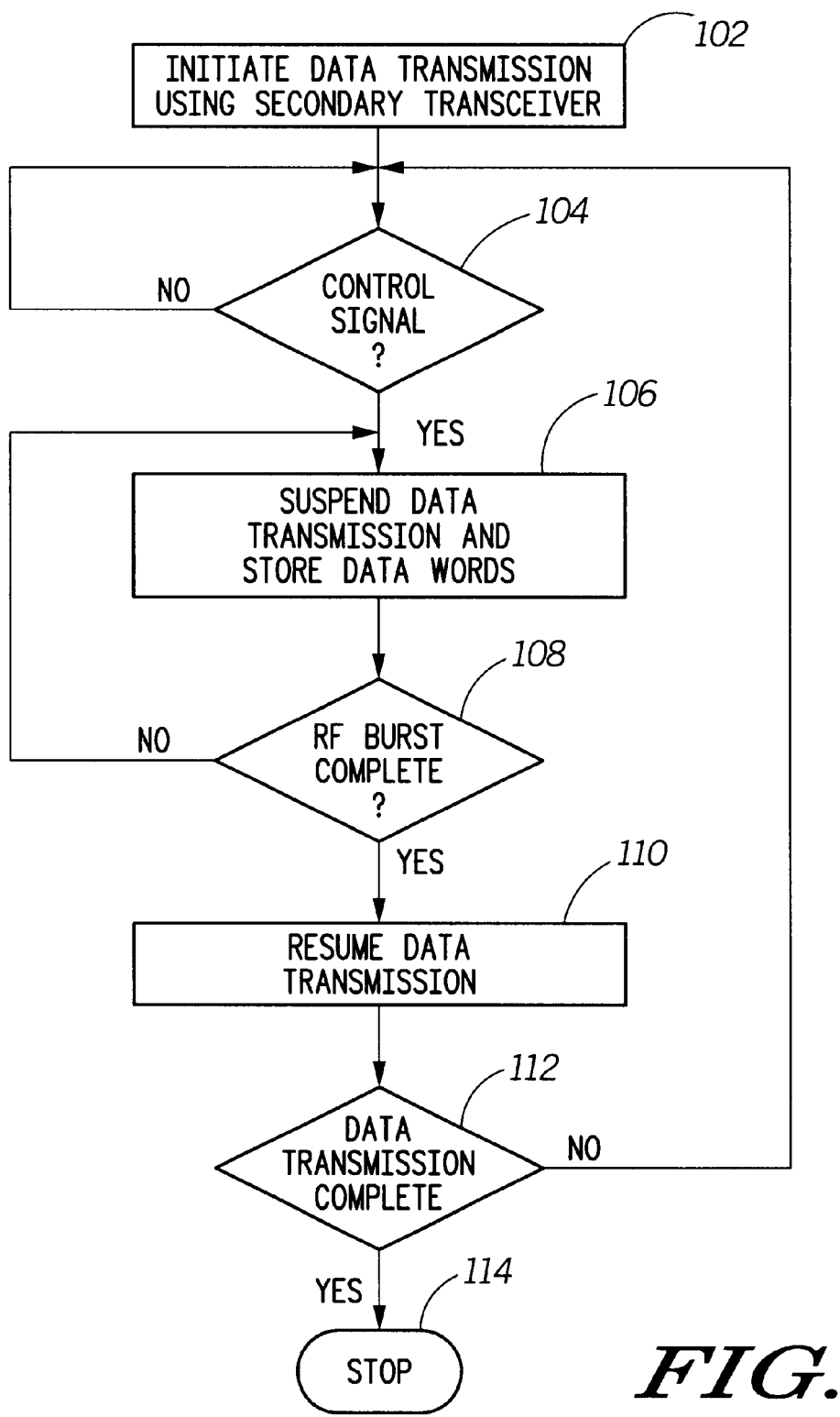
FIG. 4 is a flow chart illustrating a method of operating a wireless communication device in accordance with a preferred embodiment.

Referring to FIG. 1, a wireless communication device 10 operates in accordance with one or more communication standards within a wireless communication system 12. For example, the wireless communication device 10 and the wireless communication system 12, generally, may operate in accordance with one or more communication standards for cellular telephony, such as without limitation, any of the GSM 900, DCS 1800 and PCS 1900 standards.

Wireless communication device 10 communicates via radio frequency signals with one or more base stations (one shown as base station 14) in accordance with the governing communication standard. Preferably, the wireless communication device 10 includes numerous functions in addition to providing wireless voice communication, and in accordance with a preferred embodiment, the wireless communication device 10 includes a secondary communication capability. The secondary communication capability may be in the form of a secondary infrared (IR) transceiver, such as, for example, the aforementioned HSDL-3201, IrDA transceiver from Hewlett Packard. Using this secondary communication capability, the wireless communication device 10 is capable of communicating data to other equally capable wireless communication devices, such as cellular radiotelephones and pagers, and other devices such as PCs, printers, and PDAs. These other devices are generally illustrated in FIG. 1 as peripheral device 16. In this manner, data within the wireless communication device 10, such as names and associated phone numbers and addresses, calendar data, task lists, notes, email, and the like may be exchanged with the peripheral device 16, and the data stored within both devices may be synchronized.

With reference to FIG. 2, the wireless communication device 10 includes a controller 20, such as a microcontroller, that is coupled to an RF communication module 22 and an IR communication module 24. The RF communication module 22 may receive voice and/or data signals directly from the controller 20 (as shown in FIG. 2), or may receive signals directly from other sources. Under the control of controller 20, the RF communication module 22 codes and modulates these signals for transmission. For example, the RF communication module 22 may code the signals for time-division multiplexed (bursted) radio frequency transmission. The RF communication module 22 also operates in a receive mode for receiving, demodulating and decoding signals 27 received at an antenna 28.

The RF communication module 22 has an output coupled to a power amplifier 26, and the power amplifier 26 is coupled to the antenna 28. The controller 20 directly communicates with the power amplifier 26 via a control line 30 for providing a control signal to the power amplifier 26. Responsive to the control signal, the power amplifier 26 is capable of amplifying the coded and modulated signal from the RF communication module 22 for transmission from the antenna 28. The control signal may be either or both of an amplifier pre-enable signal and an amplifier enable signal. The amplifier pre-enable signal, as the name suggests, is an indication to the power amplifier 26 of an imminent RF transmission. The amplifier enable signal activates the power amplifier 26. It is possible, depending on the construction and operation of the communication device 10, that neither the pre-enable signal nor the enable signal will be available. It will be appreciated that in such instances the controller 20 may be configured to provide a suitable control signal directing the status of the power amplifier 26.

The IR communication module 24 is also coupled to the controller 20 and data signals received by the IR communication module 24 from the controller 20 are coded and modulated for transmission via an IR light emitting diode (IR-LED) 25. The IR communication module 24 monitors the control signal from the controller 20 to the power amplifier 26 via a control line 31 that is coupled to the control line 30. The IR communication module 24 is also operable in a receive mode, wherein IR signals received at either at a photodiode 23 within the IR communication module 24 are demodulated and decoded.

The controller 20 is coupled to a memory 32 that contains at least several data structures. For example, one data structure contains the program instructions that govern the operation of the controller 20, and hence the function of the wireless communication device 10. Another data structure contains various operating data required for the proper functioning of the wireless communication device 10. The memory 32 may also include a data structure wherein various other data, such as names, phone numbers, addresses, calendar data, and the like, are stored. This data may be manually input into the wireless communication device 10, for example, using a keypad (not depicted), or the data may be downloaded to the wireless communication device 10. The IR communication module 24 provides the capability to download data from the memory 32 and or to write data to the memory 32 from a source external to the wireless communication device 10. It will be appreciated that while shown as a single memory element, the memory 32 may be implemented as several memory devices.

With reference again to FIG. 1, the wireless communication device 10 and the peripheral device 16 operate in close proximity, e.g., within about 20–100 cm. The wireless communication device 10 sends data to the peripheral device 16 via IR signals 34 and receives data from the peripheral device 16 via IR signals 36. The IR signals 34 and 36 are structured in accordance with one or more well-known IR communication protocols with each transmitted word including a start bit and a stop bit in asynchronous communication.

The wireless communication device 10 and the peripheral device 16 further operate in the presence of an RF energy field 38 generated in proximity to the antenna 28. The RF energy field 38 results from the transmission of RF communication signals 27 from the wireless communication device 10 to the base station 14. The RF energy field 38 may significantly impair, if not entirely degrade, the ability of the peripheral device 16 to receive communication using the IR data signals 34. This is because, as described above, many peripheral devices may not be designed to adequately shield and/or filter the interference presented by the RF energy field 38.

In accordance with the various wireless communication protocols, however, the RF energy field 38 does not exist continuously. Instead, the wireless communication device 10 may communicate by sending periodic bursts of RF energy such as the case in a time-division multiplexed communication system. For example, in accordance with the GSM standard, the power amplifier 26 shown in FIG. 2 transmits by generating bursts of RF energy. More specifically, responsive to the enable signal from the controller 20, the power amplifier 26 transmits a 542.8 microsecond ($\mu$sec) burst at a 217 Hertz (Hz) repetition rate. The pulsed operation of the power amplifier 26 may be advantageously exploited in accordance with a preferred to enhance communications between the wireless communication device 10 and the peripheral device 16 using the IR signals 34 and 36.

First, it should be recognized that priority within the wireless communication device 10 resides with sending the RF communication signals 27, and hence, eliminating the existence of the RF energy field 38 entirely during IR signal transmission may not be possible. Given that the RF communication signals 27 are sent in a burst format, the periods between the bursts may be exploited for sending the IR signals 34 from the wireless communication device 10 to the peripheral device 16. IR signals 36 transmitted from the peripheral device 16 to the wireless communication device 10 should not be problematic because the wireless communication device 10, being designed to operate in the presence of RF energy, will not generally be adversely effected for the receiving of IR signals 36 from the peripheral device 16. The same is not necessarily true, however, of the peripheral device 16.

With reference to FIG. 3, trace 40 represents the burst operation of the power amplifier 26 for transmitting RF communication signals from the wireless communication device 10 to the base station 14. The trace 42 represents the operation of the IR communication module 24 for transmitting the IR signals 34 to the peripheral device 16. As observed, the IR signals 34 are transmitted during the portion of time, $t_i$, during which the power amplifier 26 is idled, in accordance with the communication standard.

With reference again to FIG. 2, the IR communication module 24 is capable of monitoring the control signal from the controller 20 to the power amplifier 26 via control line 31. Alternatively, the controller 20 may be configured to directly communicate the control signal to the IR communication module 24 on a separate control line. The IR communication module 24 is then responsive to the control signal to suspend transmission of the IR signals 34. In accordance with the preferred embodiments, several strategies may be implemented in connection with suspending and restarting transmission of the IR signals 34.

As shown in FIG. 2, a hardware memory 46 is coupled to the IR communication module 24, although the memory may be provided internal to the IR communication module 24. Upon receipt of either the pre-enable or the enable signal, the IR communication module 24 may suspend immediately, mid-word, and begin storing data words that are to be transmitted in the memory 46. When the enable signal is no longer present, the IR communication module 24 can at the appropriate time resume transmission of the IR signals, beginning with the data words retained in the memory 46, while storing newly received data words within the memory 46. There may be a slight pause before the transmission of data words is resumed to permit the RF energy field 38 to fully dissipate. Alternatively, the memory 46 may be implemented using software, wherein the data words are addressed and stored within a random access memory portion of the wireless communication device 10. It should be further appreciated that the memory need not be provided with the IR communication module 24, but instead memory 32 may include an additional data structure that is arranged to provide the temporary storage function. In such an arrangement, the controller 20 may directly store the data words within the memory 32 during suspension of the IR transmission.

To prevent suspension of an IR transmission mid-word and where the control signal at least includes a pre-enable signal, either the IR communication module 24 or the controller 20 may be responsive to the pre-enable signal to determine if sufficient time exists within which to transmit the next word. If there is insufficient time to transmit the next word, the next word may be stored with either the memory 46 or the memory 32, as described, along with each subsequent data word until the IR communication module 24 may resume transmission, i.e., following the RF burst transmission.

An advantage of the communication device and method is a reduction in the peak power requirement of the communication device 10. Because the IR signals are suspended during the RF burst, the IR transmitter and the RF transmitter are not operated simultaneously. Since the IR transmitter and the RF transmitter typically have the highest power requirements within the communication device 10, the communication device and method provides the added advantage of reducing the peak power requirement.

By suspending transmission of the IR signals 34 during the RF burst, however, the effective data rate for the IR transmission is reduced by a factor corresponding to the transmission rate of the RF burst. For example, the RF burst specified by the GSM 900 standard is an 1/8 rate burst. Thus, the effective data rate for the IR transmission, which may normally be specified as 115.2 kb/s, will be reduced to about 100.8 kb/s.

So far the communication device and method has been described in terms of the wireless communication device 10 having a secondary transceiver for communication of data between the wireless communication device 10 and the peripheral device 16 wherein the secondary transceiver is an IR transceiver module. The invention, however, is not so limited. The communication device and method has application where the data communication between the wireless communication device 10 and the peripheral device 16 is accomplished using low power RF transmissions. Alternatively, pulsed lasers and other optical transmission devices other than IR may be used. Additionally, the invention is not limited to the situation where the offending energy field is the result of an RF transmission.

Referring now to FIG. 4, a method 100 of operating a wireless communication device in accordance with a preferred embodiment is illustrated in flow chart form. At step 102, the IR communication module 24 initiates data transmissions between the wireless communication device 10 and the peripheral device 16. At step 104, the IR communication module 24 receives the control signal, preferably the pre-enable signal, and responsive thereto the IR communication module 24 suspends transmission of the data transmission and begins buffering of the data words in the memory 46, step 106. Once the RF burst transmission is completed, in step 108, which may be indicated by the absence of the power amplifier enable signal, the IR communication module resumes data transmission, step 110. The data words retained within the memory 46 are transmitted and data transmission continues, step 112, until completed, step 114.

The resumption of the IR transmission may be delayed slightly following passage of the RF burst, and hence, the suspended transmission period may be slightly longer than the actual duration of the RF burst. The slightly longer duration permits the RF energy field to sufficiently dissipate so as not to have an adverse effect upon resumption of the IR transmissions. In addition, if at step 104 the control signal is an amplifier pre-enable signal, the IR communication module 24 may be responsive to the pre-enable signal to suspend further IR transmissions and to begin storing data words for the duration of the RF burst. Step 104 may further include determining based upon receipt of the pre-enable signal, if the present data word may be completed or if a next data word may be sent prior to the oncoming RF burst, and if so, transmitting the remaining data.

Still other modifications and alternative embodiments will be apparent to those skilled in the art in view of the foregoing description. This description is to be construed as illustrative only, and is for the purpose of teaching those skilled in the art the best mode of carrying out the invention. The details of the structure and method may be varied substantially without departing from the spirit of the intention, and the exclusive use of all modifications that come within the scope of the appended claims is reserved.

We claim:

1. A wireless communication device comprising:
   a controller for generating a control signal;
   a primary communication module, coupled to the controller, adapted to provide a pulsed communication signal responsive to the control signal; and
   a secondary communication module, coupled to the controller, arranged to transmit a data communication signal and being responsive to the control signal to suspend an ongoing transmission of the data communication signal for a duration of the pulsed, communication signal.

2. The wireless communication device of claim 1, further comprising a memory, coupled to the controller, arranged to retain a portion of the data communication signal for the duration of the pulsed communication signal.

3. The wireless communication device of claim 2, wherein the memory comprises one of a hardware buffer and a software buffer.

4. The wireless communication device of claim 1, wherein the wireless communication device comprises one of a cellular radiotelephone and a pager.

5. The wireless communication device of claim 1, wherein the secondary communication module comprises one of an infrared transceiver and a low-power radio frequency transceiver.

6. The wireless communication device of claim 1, wherein the primary communication module comprises a radio frequency transceiver adapted for burst operation.

7. The wireless communication device of claim 1, wherein the control signal comprises at least one of a pre-enable signal and an enable signal.

8. The wireless communication device of claim 1, wherein the pulsed communication signal comprises a time-division multiplexed radio frequency communication signal.

9. A wireless communication device comprising:
- a radio frequency transceiver adapted for burst transmission responsive to a control signal in accordance with at least one communication protocol;
- an infrared transceiver adapted for asynchronous data communication, the infrared transceiver being responsive to the control signal to suspend an ongoing data communication; and
- a controller coupled to each of the radio frequency transceiver and the infrared transceiver, the controller being operable to generate the control signal in accordance with the at least one communication protocol.

10. The wireless communication device of claim 9, further comprising a memory arranged to store data while the ongoing data communication is suspended.

11. The wireless communication device of claim 10, wherein the memory comprises one of a hardware buffer and a software buffer associated with at least one of the infrared transceiver and the controller.

12. The wireless communication device of claim 9, wherein the wireless communication device comprises one of a cellular radiotelephone and a pager.

13. The wireless communication device of claim 9, wherein the control signal comprises one of a pre-enable signal and an enable signal.

14. A method of controlling a communication device, the communication device comprising a primary transceiver for sending primary communication signals in accordance with a first communication protocol and a secondary transceiver for sending secondary communication signals in accordance with a second communication protocol, the method comprising the steps of:

- initiating a communication of data words from the communication device to a recipient device using the secondary transceiver;
- observing a control signal, the control signal indicating an activation of the primary transceiver;
- responsive to the control signal, suspending the communication of data words;
- storing data words that would have been transmitted while the communication is suspended; and
- resuming the communication following a deactivation of the primary transceiver.

15. The method of claim 14, wherein the step of observing a control signal comprises observing at least one of a pre-enable signal and an enable signal.

16. The method of claim 14, wherein the step of suspending the communication comprises determining that an additional data word is available for communication before the primary transceiver is activated, and communicating the additional data word before the primary transceiver is activated.

17. The method of claim 14, wherein the step of resuming the communication comprises waiting a predetermined time period following deactivation of the primary transceiver.

18. The method of claim 14, wherein the step of resuming the communication comprises first communicating the stored data words.

19. A method in a wireless radio communication device, comprising:
- transmitting a first radio signal from a first transmitter of the wireless radio communication device;
- transmitting a second signal for an intermittent time period during the transmission of the first radio signal, the second signal transmitted from a second transmitter of the wireless radio communication device;
- interrupting the transmission of the first radio signal during the transmission of the second signal and resuming transmission of the first radio signal upon completion of the transmission of the second signal.

20. The method of claim 19, buffering information of the first radio signal at least during the interruption of the transmission of the first radio signal.

21. The method of claim 19, interrupting the transmission of the first radio signal during the transmission of the second signal with a controller and resuming transmission of the first radio signal upon completion of the transmission of the second signal in response to signals with the controller.

* * * * *